Patented Feb. 16, 1937

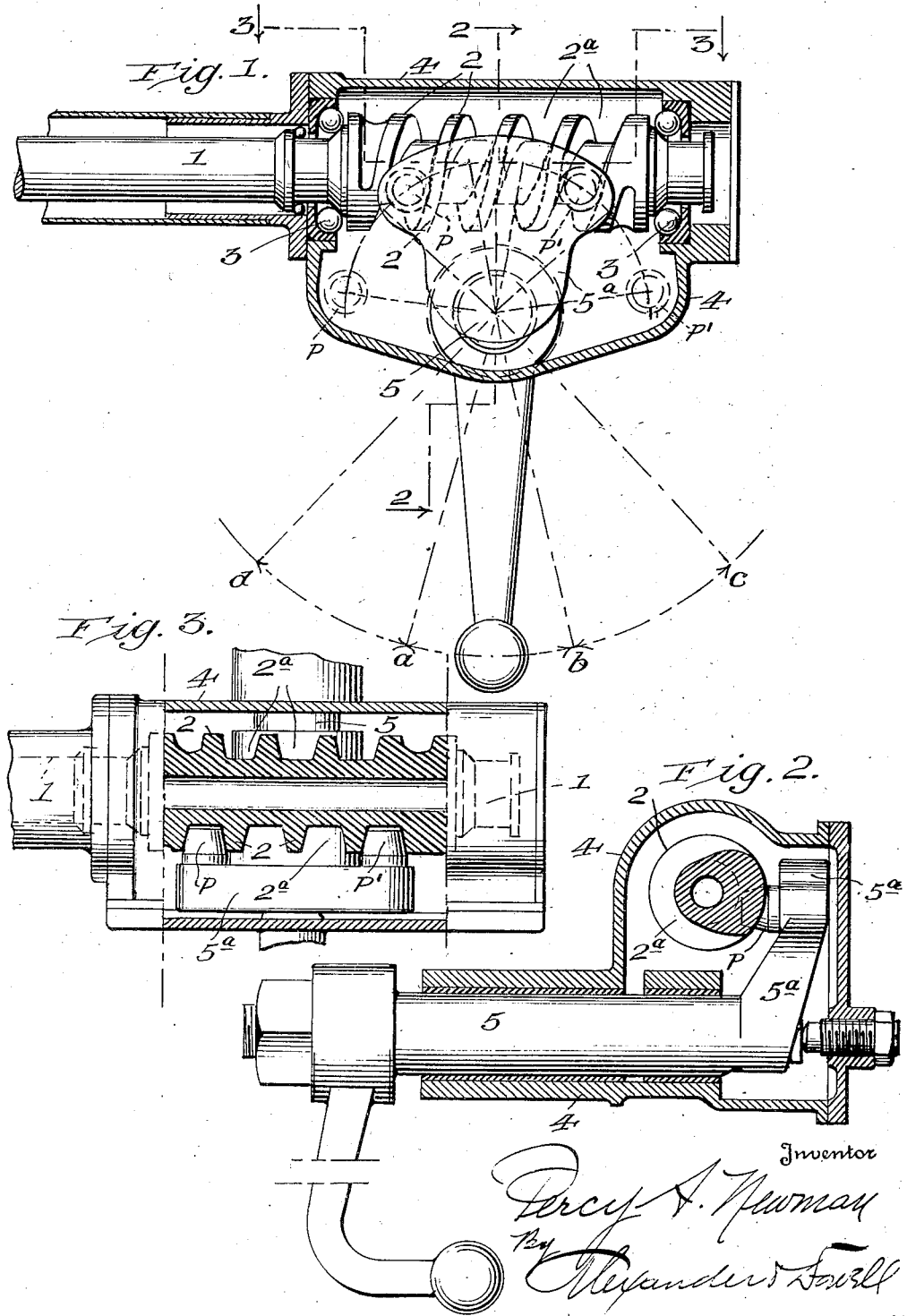

2,071,235

UNITED STATES PATENT OFFICE 2,071,235

CAM AND LEVER STEERING GEAR

Percy A. Newman, Lafayette, Ind., assignor to Ross Gear & Tool Company, Lafayette, Ind., a corporation of Indiana Application October 11, 1935, Serial No. 44,603

4 Claims. (Cl. 74—497)

This invention is an improvement in steering gears of cam and lever type such as disclosed in Ross Patent 1.567,997, dated December 29, 1925.

The invention provides an improved steering gear of this type having two spaced followers or pins on the rocker shaft arm adapted to simultaneously engage spaced portions of the helical groove in the worm or actuating member on the steering shaft during the normal driving range of the gear; and will permit an extra throw of the rocker shaft for parking range movements by allowing one pin to pass out of engagement with the actuating member while the other pin remains in engagement therewith.

The object of the invention is to improve steering gears of that type by providing the same with two spaced pins or followers on the rocker shaft arm adapted to simultaneously engage spaced portions of the helical groove in the cam or actuating member on the steering shaft during the normal driving range of the gear, and will permit an extra throw of the rocker shaft for parking range movements by allowing one pin to pass out of engagement with the actuating member while the other pin remains in engagement therewith.

Another object of my invention is to provide the mid-portion of the cam on the steering shaft with a lesser lead or axial pitch than the end portions thereof in order to secure increased mechanical advantage upon the rocker arm when one of the pins or followers thereon is engaged with the mid-portion of the cam groove.

A further object of my invention is to distribute pressures or thrusts between the cam and followers.

Further objects of my invention will become obvious from the following description.

Referring to said drawings:

Fig. 1 is a view of the gear with a part of the casing removed;

Fig. 2 is a section on the line 2—2 of Fig. 1;

Fig. 3 is a detail section on the line 3—3 of Fig. 1; and

Figure 4:
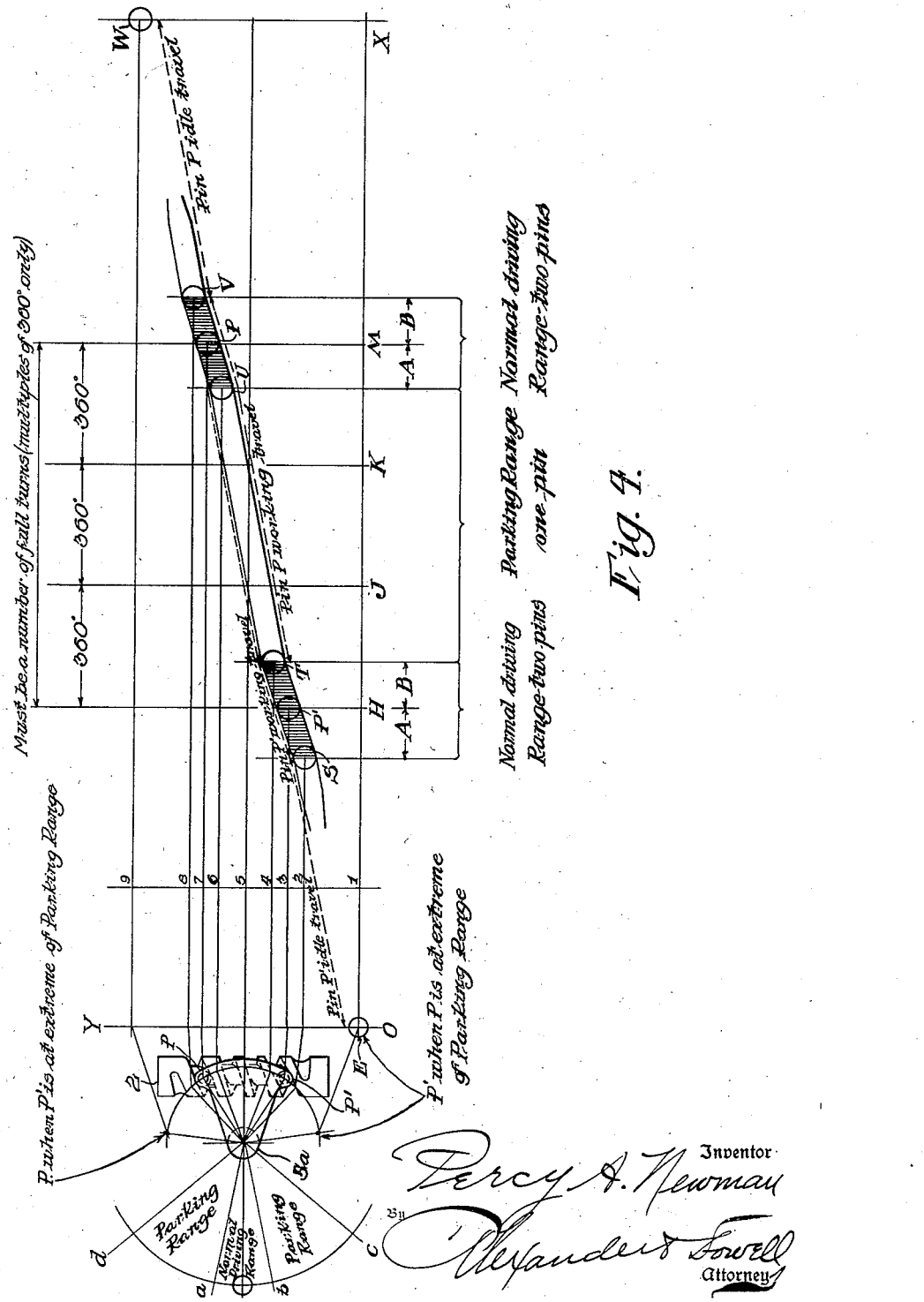
Fig. 4 represents a development of the cam curve.

The steering shaft I may be of usual construction, and is provided on one end thereof with a cylindrical actuating member or cam 2, having a helical cam groove 2a therein, which groove varies in lead or axial pitch as hereinafter explained. The cam 2 is supported on thrust bearings 3 in a suitable casing 4.

Pivotally supported in said casing, and extending at right angles to the steering shaft I, is a rocker shaft 5 having an arm 5a. The arm 5a carries two spaced followers, P and P′, which in the form illustrated are pins, but may be of any other suitable construction, as rollers. The axial centers of these followers or pins are on the arc of a circle the center of which coincides with the axial center of the rocker shaft; and both pins are normally engaged in the helical cam groove 2a for straight-ahead driving. However one of the pins leaves the effective portion of the groove when the other pin is engaged therein in parking range movements of the rocker shaft due to the shape of the cam and disposition of the pins, as best illustrated by Fig. 4.

The groove 2a in the actuating member is so shaped and the pins 5b on the head 5a so spaced that both pins will be in engagement with spaced portion of the groove during the arc of movement indicated between the points $a$ and $b$ Fig. 1; and the right hand pin will remain in engagement with the groove during the arc of movement indicated between the points $b$ and $c$; and the left hand pin will remain in engagement during the arc of movement indicated between the points $a$ and $d$. The movement in the arc $a$ and $b$, in which both pins are engaged, is amply sufficient for the normal driving range; while the one pin engagement in the arcs $b$—$c$ and $a$—$d$, permit additional parking range movements. The total range of movement between the points $d$ and $c$ of the gear being greater than can possibly be obtained with a single pin and worm actuating member; while range of movement between $a$ and $b$ is sufficient for steering under the ordinary road conditions, and during such range of movement the safety of the gear is enhanced because both pins are in engagement with the actuating member.

Using the graphical method ordinarily followed in making drawings of cylindrical cams, Fig. 4 shows a lay-out of one form of cam illustrating my invention. In developing the cam groove illustrated in Fig. 4, only those factors have been considered which are deemed essential to illustrate the principles of my invention. In other words, the cam curve illustrated by Fig. 4 has not been plotted from specific data because the varying cam curve illustrated can be varied over a wide range so long as the varying portions of the curve have the general relationship disclosed and the pins are disposed as indicated.

In the development schematically illustrated by Fig. 4, the rotation of the cam is plotted on the axis O—X and the travel of the arm is represented on the axis O—Y. The path of movement of the pins P and P′ is represented on the developed view by the line E—S—T—U—V—W. That portion of this path from S to V represents the portion of the effective cam groove engaged by the pins P and P', although the groove will ordinarily be extended at each end slightly beyond these points due to the manner of cutting the same; while the distance from S to E represents the travel of the pin P' beyond the cam groove; and the distance from V to W represents the travel of the pin P beyond the other end of the groove. The distances S—T and U—V represent the normal driving travel of the two pins P' and P, and these portions of the cam must be inclined at the same angle (i. e., the axial pitch of the cam between these portions must be the same), the angle or pitch depending upon the predetermined ratio between the cam and follower during the normal driving range.

The portion T—U of the cam is that engaged by the pin which remains in engagement with the cam when the other pin has passed out of effective engagement with the groove; that is, during the parking range of the cam. This portion of the cam is inclined at a small angle to the horizontal (i. e., has a lesser axial pitch) than the portions S—T and U—V in order to provide increased leverage upon the rocker arm when the pin is engaged in said portion of the groove.

It will be observed that upon rotation of the cam, the pins move in an arcuate path and the vertical distances they travel for certain degrees of rotation of the cam as shown on the O—X axis, is indicated by the spaces between the numerals 1—2, 2—3, etc., on the O—Y axis. For example, starting with the pins at the places illustrated in Fig. 4, with the pin P' on the vertical line H and the pin P on the vertical line M, respectively, upon rotation of the cam in a clockwise direction, looking down axially therealong, the rocker shaft 5a will be rocked upwardly by the pins or followers P' and P. If the cam is rotated only enough to cause the pins P' and P, to be raised through the vertical distances 3—4 and 7—8, respectively, the lineal distances traveled by the pins will be the distances from P' to T and P to V, respectively. This represents half of the normal driving range of the cam. During the meantime, the free end of the rocker arm will swing from its mid or zero position to the points designated by the letter "b" (Figs. 1 and 4).

A continued rotation of the cam in the same direction will cause the follower P to leave the effective portion of the cam groove and the follower P' to enter the parking range portion of the groove. As hereinbefore stated the lead or axial pitch of this portion of the groove is less than those of the driving range. Consequently the leverage on the rocker shaft 5a is greater. To state the matter in another way, it will take a greater number of turns of the cam to cause the pin P' when engaged in the parking range portion of the groove to be moved a certain distance than it would to be moved the same distance if it were engaged in the driving range portion of the groove. This results in greater ease in parking due to the increased mechanical advantage. Also, the use of two pins results in either of them being engaged in the groove longer than would be possible if only one pin were used and, therefore, permits of a greater parking range.

The length of the cam groove between the points H—J, J—K, and K—M, must be 360°, or the distance between the points H—M on the O—X axis must be multiples of 360°, in order that when the two pins or followers are engaged in the cam groove in the normal driving range, the portions of the groove engaged by the pins will be parallel and will not cause binding between the pins and the groove.

It will be seen from the foregoing that a variable gear ratio is furnished to give maximum directional control for high speeds and ease of parking.

My improved gear also provides increased safety for high speed range, thus giving considerable reduction in unit pressures over existing mechanisms, by reason of the fact that two pins are engaged during high speed driving. In parking operation only one pin is used and the effective leverage on the rocker shaft increases as it operates through the parking range.

I claim:—

1. In a steering gear, a steering shaft provided with a cylindrical cam having two spaced portions of the same axial lead and an intermediate portion of lesser axial lead, a rocker arm pivoted in juxtaposed relationship to said cam, the said arm having two followers thereon, the said followers being spaced to simultaneously engage the portions of said cam having the same axial lead and to singly engage said intermediate portion when the other of said followers is out of effective engagement with said cam.

2. A steering gear comprising a cam and rocker shaft provided with two followers, the said cam having two spaced portions of the same axial lead and an intermediate portion of lesser axial lead, the length of the effective portion of the cam from center to center of the portion having the same axial lead being a multiple of 360°, and the said followers being spaced so that when one thereof is engaged with the portion of said cam having the greater axial lead the other thereof will be out of effective engagement with said cam and so that both of said followers will simultaneously and respectively engage the portions of said cam having the same axial lead.

3. In a steering gear, a steering shaft provided with a cylindrical cam having a helical groove, two spaced portions of said groove being of the same axial lead and an intermediate portion of the groove being of a different axial lead, a rocker shaft at right angles to said cam, an arm on said shaft, and two pins on said arm, the said pins being spaced to simultaneously engage the portions of said cam having the same axial lead, and to singly engage said intermediate portion when the other of said pins is out of effective engagement with said cam.

4. A steering gear comprising a cam having a helical groove, a rocker shaft provided with an arm, and two pins on said arm, the said cam groove having two spaced portions of the same axial lead and an intermediate portion of different axial lead, the length of the effective portion of the cam from center to center of the portion having the same axial lead being a multiple of 360°, and the said pins being spaced so that both pins will simultaneously engage the portions of said cam having the same axial lead during driving range movements of the gear, and so that when one pin is engaged with the said intermediate portion of said cam the other pin will be out of effective engagement with said cam during parking range movement of said gear.

PERCY A. NEWMAN.